(12) United States Patent
Kong et al.

(10) Patent No.: US 12,489,679 B2
(45) Date of Patent: Dec. 2, 2025

(54) SYSTEM AND METHOD FOR CONTROLLING NETWORK DEVICE(S) AT A PRIMARY NETWORK DEVICE

(71) Applicant: Pismo Labs Technology Limited, Kowloon (HK)

(72) Inventors: Cheuk Pang Kong, Kowloon (HK); Alex Wing Hong Chan, Kowloon (HK); Yu Yeung, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 40 days.

(21) Appl. No.: 18/668,084

(22) Filed: May 17, 2024

(65) Prior Publication Data
US 2025/0358187 A1    Nov. 20, 2025

(51) Int. Cl.
| G06F 15/177 | (2006.01) |
| H04L 12/46 | (2006.01) |
| H04L 41/0893 | (2022.01) |
| H04L 41/0894 | (2022.01) |

(52) U.S. Cl.
CPC ...... *H04L 41/0894* (2022.05); *H04L 12/4633* (2013.01); *H04L 41/0893* (2013.01)

(58) Field of Classification Search
CPC ............. H04L 41/0894; H04L 12/4633; H04L 41/0893
USPC ......................................................... 709/220
See application file for complete search history.

(56) References Cited

U.S. PATENT DOCUMENTS

| 6,199,165 B1 * | 3/2001 | Grunner | H04Q 11/0457 705/64 |
| 7,218,615 B2 * | 5/2007 | Schwartze | H04L 41/0806 370/254 |
| 11,206,203 B2 * | 12/2021 | Kane | H04L 41/145 |
| 2009/0287800 A1 * | 11/2009 | Chi | H04L 67/125 709/220 |

* cited by examiner

*Primary Examiner* — Alicia Baturay
(74) *Attorney, Agent, or Firm* — Hershkovitz & Associates, PLLC; Abe Hershkovitz

(57) ABSTRACT

This present invention discloses methods and systems for transmitting data packets over a wide area network (WAN) through secondary network devices connected to a primary network device. The primary network device first takes control of the secondary network devices' network settings. Then, it creates two separate connections: one for managing the secondary network devices (using management interfaces) and another for transmitting data (using transmission interfaces). The data packets transmit through the WAN connection on the secondary network devices using a special tunnel created within the data connection, following rules set by a policy.

20 Claims, 10 Drawing Sheets

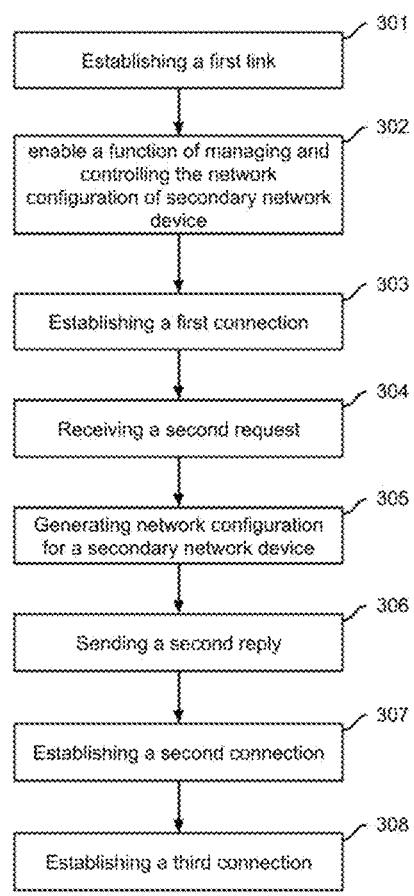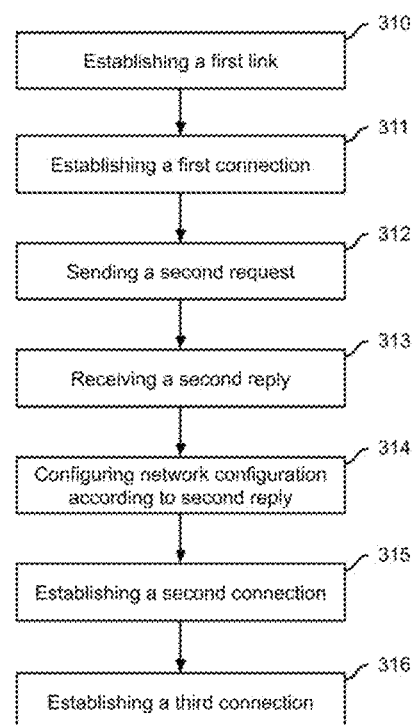
Fig. 3A
Fig. 3B

| WAN Connections | | | | |
|---|---|---|---|---|
| Name | Status | WAN interface | Priority | Latency |
| Home_Wifi | ● | Device 1 | Medium | 10ms |
| Satellite | ● | Device 3 | Low | 31ms |
| Ethernet | ● | Device 2 | High | 11ms |
| 4G | ● | Device 3 | Backup | 5ms |
| Broadband | ○ | Device 3 | - | - |

Fig. 8

SYSTEM AND METHOD FOR CONTROLLING NETWORK DEVICE(S) AT A PRIMARY NETWORK DEVICE

TECHNICAL FIELD

The present invention relates to network communication. More specifically, the present invention relates to a network device utilizing the Wide Area Network (WAN) interface of another network device.

BACKGROUND ART

Network devices enable connectivity and facilitate local devices' internet access. As technology advances, connection standards and hardware rapidly evolve to meet the needs of current applications. This necessitates regular updates to both the firmware and hardware of network devices. While users may find upgrading firmware to be a relatively simple task, the cost associated with replacing the device remains a significant consideration.

When upgrading the hardware, it will be costly for users to always replace their existing network device with a new network device with only one or two additional functions.

For example, a company deployed a network environment for their employees using routers equipped with two ethernet WAN interfaces. However, as technology continues to develop, the company needs cellular WAN interface(s). The company could consider replacing the original network devices with the new network devices equipped with a cellular module, but the costs of such replacement would be high.

As an alternative, the company may purchase network devices with limited functionality but come with a cellular module, and connect the new network devices to the original network devices. As the new network device with the required cellular module only has limited functionality, it is expected to be much less expensive than the new network device. By integrating the new network devices with limited functionality (that include the desired cellular module) into their existing network environment, users can reduce costs of the upgrade but still achieve the desirable improvement. Moreover, whether or not bonding technology is applied to bond the connections together, the capability to utilize more WAN resources is beneficial in a sense that it increases the bandwidth and the throughput of the overall connection.

However, in this alternative scenario, the network configuration of the network devices is being managed and controlled separately. The lack of centralized control limits visibility and coordination, making it difficult to monitor network performance effectively, identify bottlenecks, and optimize resource utilization. When network resources are not managed in a coordinated and integrated manner, it can result in inefficiencies, reduced performance, and potential challenges in maintaining a stable and optimized network environment.

Therefore, the present invention provides the method and system for a primary network device to manage and control at least one secondary network device, and further utilize the WAN interfaces of the at least one secondary network device to transmit data packets to the interconnected network.

SUMMARY

The present invention discloses a method for a primary network device to control and manage the network configuration of the secondary network device whilst utilizing the WAN interface of a secondary network device. The primary network device may connect to at least one secondary network device through the first link and establish a first connection. The primary network device may further establish a second connection and the third connection through the first link for controlling and managing the secondary network device and for data packet transmission respectively. The second connection and the third connection are established on the virtual network interfaces.

According to one of the embodiments of the present invention, data tunnel(s) may be further established. The set of data tunnels established is in a bijective relationship with the set of WAN interfaces of the secondary network device. Different subnets may be applied for the network interface used for establishing tunnels and the network interface used for establishing connections. Therefore, a specific WAN interface may be utilized by transmitting data packets through the corresponding tunnel, and further transmitting data packets to the interconnected network.

According to one of the embodiments of the present invention, the WAN interfaces of the primary network device or the WAN interfaces of at least one secondary network device may be selected for transmitting data packets to the interconnected network according to the policy.

According to one of the embodiments of the present invention, each of the WAN interfaces of the primary network device or each of the WAN interfaces of at least one secondary network device may be a Local Area Network (LAN) interface performing the same functionality as a WAN interface.

BRIEF DESCRIPTION OF DRAWINGS

FIG. 3A is a flowchart illustrating a method performed by the primary network device according to the embodiments of the present invention.

FIG. 3B is a flowchart illustrating a method performed by the secondary network device according to the embodiments of the present invention.

FIG. 8 illustrates an exemplary graphical user interface for the primary network device according to the embodiments of the present invention.

DESCRIPTION OF EMBODIMENTS

Figure 1A:
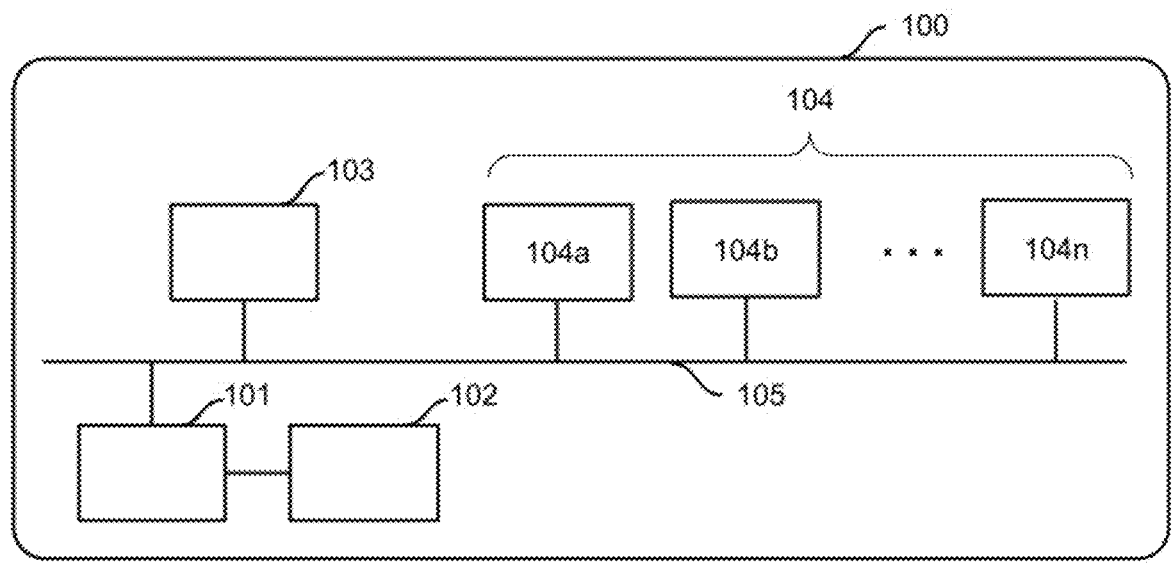
FIG. 1A is a schematic block diagram of a primary network device according to the embodiments of the present invention.

The terminology used herein is for the purpose of describing particular embodiments only and is not intended to be limited to example embodiments of the invention. As used herein, the singular forms "a", "an", and "the" are intended to include the plural forms as well, unless the context clearly indicates otherwise. As used herein, the terms "and/or" and "at least one of" include any and all combinations of one or more of the associated listed items. Expressions such as "at least one of," when preceding a list of elements, modify the entire list of elements and do not modify the individual elements of the list. The terms "comprises", "comprising", "includes" and "including", when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

While processes, steps, methods, algorithms, or the like described herein may be described in sequential order, such processes, steps, methods, and algorithms may be configured to work in alternate orders. In other words, any sequence or order of steps that may be described herein does not, in and of itself, indicate a requirement that the steps be performed in that order. The steps of the described processes may be performed in any order practical.

When an element is referred to as being "on", "connected to", "coupled to", or "adjacent to" another element, the element may be directly connected or linked to another element. However, it should be understood that still another element may be present in the middle. On the other hand, when an element is referred to as being "directly connected" or "directly linked" to other elements, it should be understood that there is no other component in the middle.

As used herein, the terms "non-transitory computer-readable storage media", "computer-readable medium", "main memory", "secondary storage medium", or "other storage medium" refers to any medium that participates in providing instructions to a processing unit for execution. The processing unit reads the data written in the primary storage medium and writes the data in the secondary storage medium. Therefore, even if the data written in the primary storage medium is lost due to a momentary power failure and the like, the data can be restored by transferring the data held in the secondary storage medium to the primary storage medium. Computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile storage includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by a processing unit. A non-volatile storage or static storage may be used for storing static information and instructions for the processor, as well as various system configuration parameters.

The storage medium may include a number of software modules that may be implemented as software codes to be executed by the processing unit using any suitable computer instruction type. The software code may be stored as a series of instructions or commands, or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When the embodiments are to be implemented by software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA) and other networks. The terms "network" and "system" are often used interchangeably. A CDMA network may implement radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement radio technology such as Global System for Mobile Communications (GSM). An OFDMA network may implement radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of the Universal Mobile Telecommunication System (UMTS). 3GPP Long Term Evolution (LTE) is a UMTS that uses E-UTRA, which employs OFDMA on the downlink and SC-FDMA on the uplink. UTRA, E-UTRA, UMTS, LTE, 5G and GSM are described in documents from an organization named "3rd Generation Partnership Project" (3GPP). CDMA 2000 and UMB are described in documents from an organization named "3rd Generation Partnership Project 2" (3GPP2).

As used herein, a "tunnel" is a communication channel between two network devices that transmits data by encapsulating the data's Internet Protocol (IP) packets according to any suitable cryptographic tunneling protocol. A network device can be any electronic device, client, server, peer, service, application, or other object capable of sending, receiving, or forwarding information over communications channels in a network. Cryptographic tunneling protocols may include without limitation, Internet Protocol security (IPsec), Secure Socket Layer/Transport Layer Security (SSL/TLS), Datagram Transport Layer Security (DTLS), Microsoft Point-to-Point Encryption (MPPE), and Secure Shell (SSH).

FIG. 1A is a schematic block diagram of a primary network device according to the embodiments of the present invention. Primary network device 100 comprises processing unit 101, main memory unit 102, storage unit 103, and a plurality of network interfaces, such as network interface 104a, 104b, . . . , 104n (collectively referred to as network interfaces 104). Processing unit 101 may be directly connected to main memory unit 102, and may be connected through bus 105 to other hardware components, such as storage unit 103, and network interfaces 104. In some exemplary scenarios, however, processing unit 101 may be directly connected to some peripheral hardware components when processing unit 101 has adequate pins; hence, a bus may not be used. Processing unit 101 may execute program instructions or code segments stored in main memory unit 102 for implementing an exemplary embodiment of the present invention.

Figure 1B:
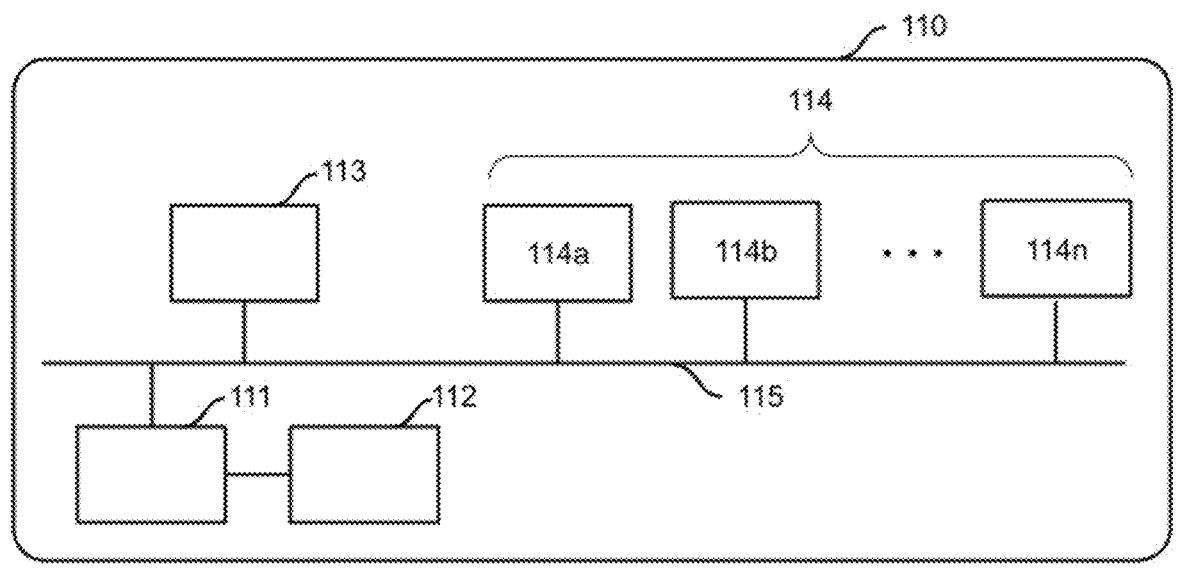
FIG. 1B is a schematic block diagram of a secondary network device according to the embodiments of the present invention.

FIG. 1B is a schematic block diagram of a secondary network device according to the embodiments of the present invention. Secondary network device 110 comprises processing unit 111, main memory unit 112, storage unit 113, and a plurality of network interfaces, such as network interface 114a, 114b, . . . , 114n (collectively referred to as network interfaces 114). Processing unit 111 may be directly connected to main memory unit 112, and may be connected through bus 115 to other hardware components, such as storage unit 113 and network interfaces 114. In some exemplary scenarios, similar to primary network device 100, processing unit 111 may be directly connected to some of the peripheral hardware components.

There are no limitations on the type of network interfaces of primary network device 100 and secondary network device 110. Each of network interfaces 104 and 114 may be a LAN interface, or a WAN interface that connects to at least one antenna and may be used as a LAN or a WAN interface.

In one variant, the WAN interface of the primary network device may perform the same functionality as a LAN interface.

In another variant, a LAN interface of the primary network device may perform the same functionality as a WAN interface.

In one variant, the WAN interface of the secondary network device may perform the same functionality as a LAN interface.

In another variant, the LAN interface of the secondary network device may perform the same functionality as a WAN interface.

In one variant, primary network device 100 and secondary network device 110 may further comprise at least one wireless communication module (WCM) to communicate through a cellular network by using a SIM or an embedded universal integrated circuit card (eUICC).

Figure 2A:
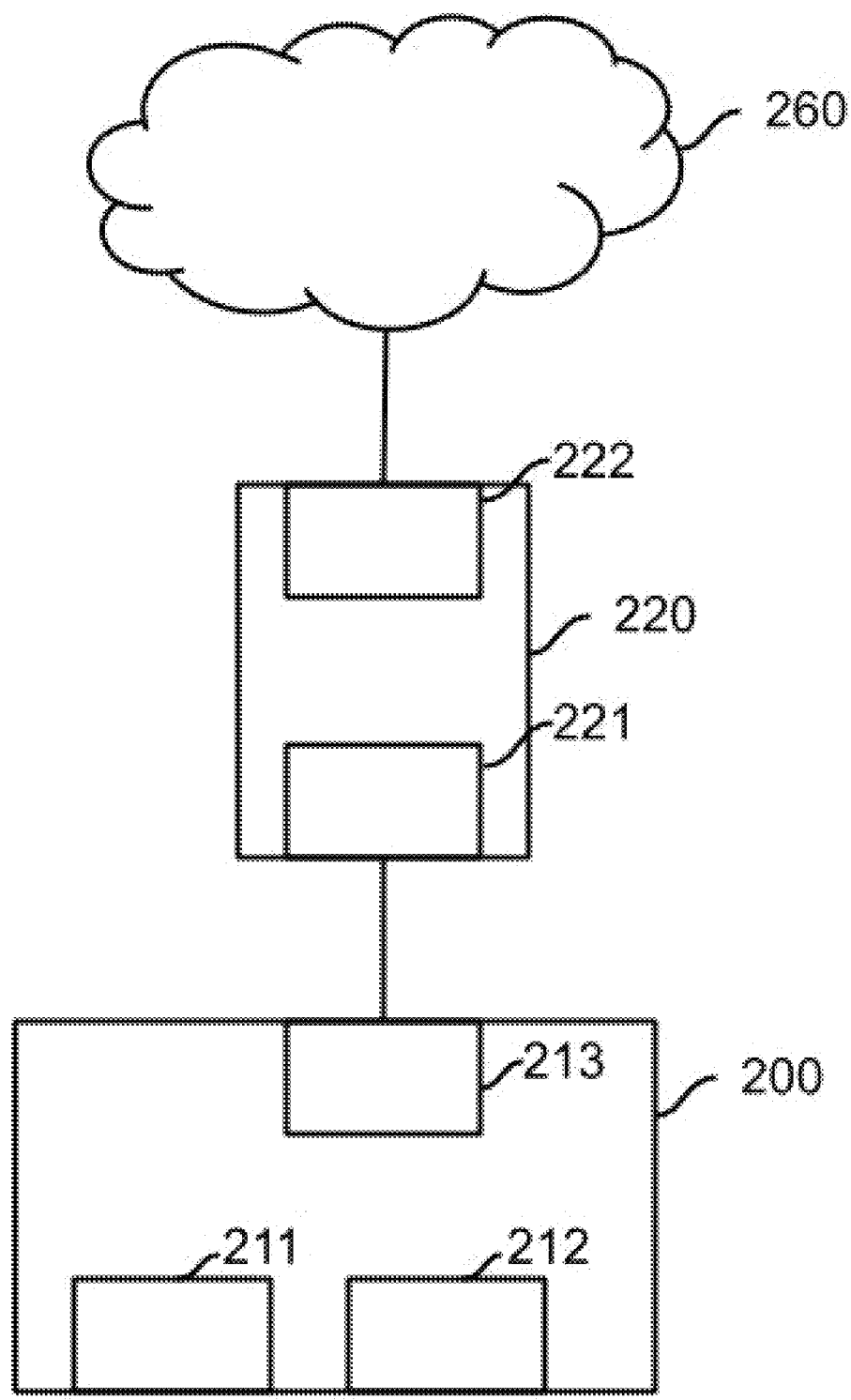
FIG. 2A is a schematic block diagram of an exemplary network environment according to the embodiments of the present invention.
Figure 2B:
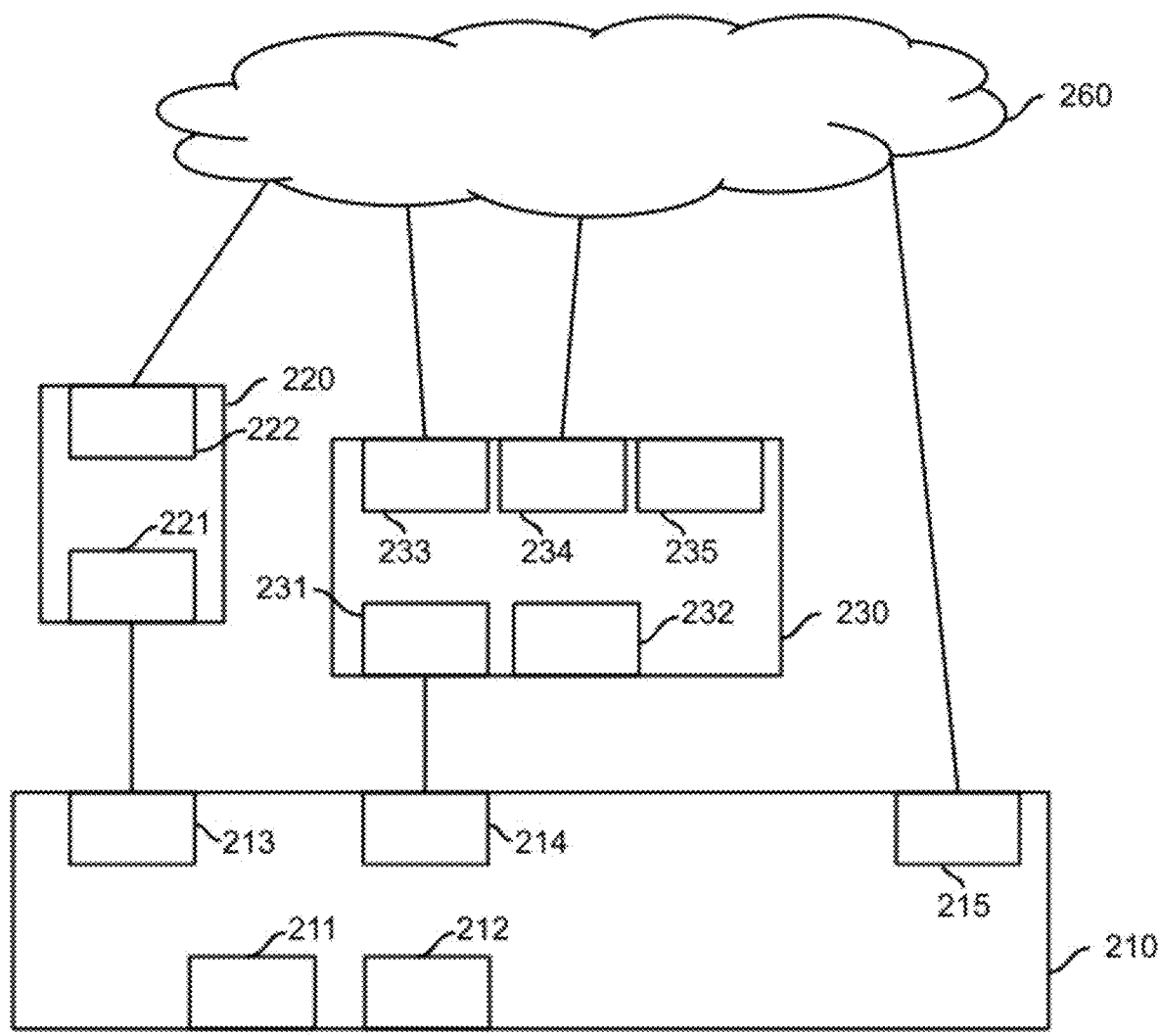
FIG. 2B is a schematic block diagram of another exemplary network environment according to the embodiments of the present invention.
Figure 2C:
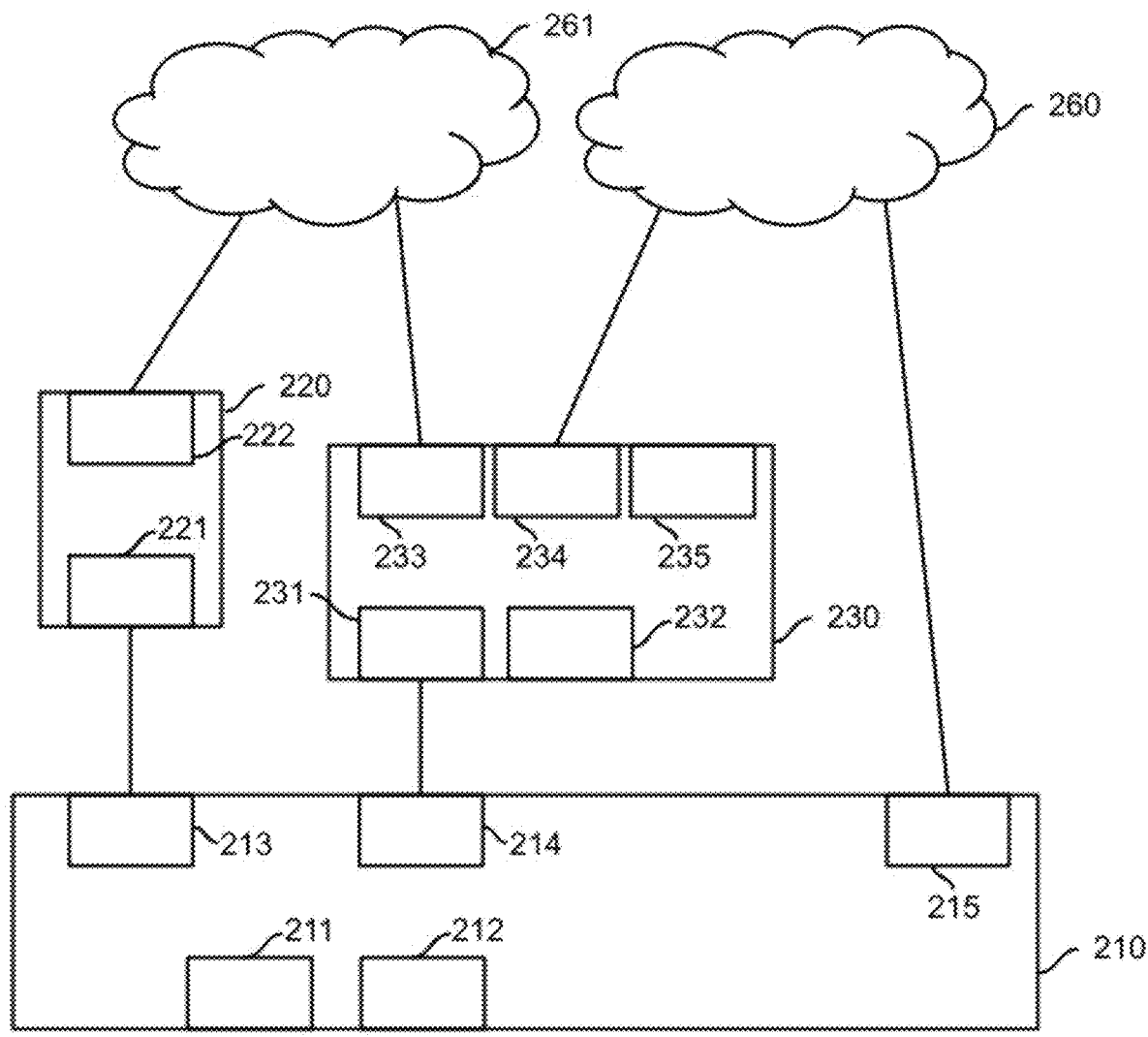
FIG. 2C is a schematic block diagram of another exemplary network environment according to the embodiments of the present invention.

FIGS. 2A-2C is a series of schematic block diagrams illustrating the exemplary network environments according to the embodiments of the present invention. Primary network devices 200 and 210 exhibit functional parallels with primary network device 100. Secondary network device 220, secondary network device 230, and secondary network device 240 exhibit functional parallels with secondary network device 110. Interconnected network 260 may be a public network, a private network, or a combination of both, such as intranet, extranet, or internet.

FIG. 2A is a schematic block diagram illustrating an exemplary network environment according to the embodiments of the present invention. FIG. 2A comprises primary network device 200, and secondary network device 220. Primary network device 200 comprises at least one LAN interface, such as LAN interfaces 211 and 212, and at least one WAN interface, such as WAN interface 213. Secondary network device 220 may comprise network interfaces, such as LAN interface 221 and WAN interface 222. Primary network device 200 may connect to secondary network device 220 via a first link connected between WAN interface 213 and LAN interface 221. Secondary network device 220 may connect to interconnected network 260 using WAN interface 222.

There are no limitations on the type of LAN interfaces and WAN interfaces of primary network device 200. Each of the LAN and WAN interfaces may be wired or wireless interfaces. Each of the LAN interfaces of primary network device 200 may be a LAN interface performing the same functionality as a WAN interface, and each of the WAN interfaces of primary network device 200 may be a WAN interface performing the same functionality as a LAN interface.

There are also no limitations on the type of the first link established between network interfaces. The first link may be Wi-Fi, ethernet cable, fiber optics, cellular, satellite connections, etc.

FIG. 2B is a schematic block diagram illustrating another exemplary network environment according to the embodiments of the present invention. FIG. 2B comprises primary network device 210, secondary network device 220, and secondary network device 230. Primary network device 210 is similar to primary network device 200 illustrated in FIG. 2A, but further comprises WAN interfaces 214 and 215. Secondary network device 230 may comprise LAN interfaces 231 and 232, and WAN interfaces 233, 234, and 235. Secondary network device 230 may connect to interconnected network 260 via WAN interface 233 and 234 with respective links. Primary network device 210 may connect to secondary network device 230 via a first link connected between WAN interface 214 and LAN interface 231, and to interconnected network 260 with another first link through WAN interface 215.

In one variant, some local devices may connect directly to the secondary network device, such as secondary network device 230 illustrated in FIG. 2B, through the LAN interface of the secondary network devices, such as LAN interface 232. The secondary network devices may route the packet received from these local devices as normal while performing the process disclosed in the present invention.

In another variant, except for the LAN interface for the first link, the secondary network device may disable the LAN interface or the network interface functioning as LAN when allowing the primary network device to manage and control the network configuration of the secondary network device.

FIG. 2C is a schematic block diagram of another exemplary network environment according to the embodiments of the present invention. Similar to FIG. 2B, FIG. 2C illustrates primary network device 210, secondary network device 220, and secondary network device 230, but the WAN interfaces of the secondary network devices 220 and 230 may connect to different interconnected networks. For example, WAN interface 234 is connected to interconnected network 260 while WAN interfaces 222 and 233 are connected to interconnected network 261.

FIG. 3A is a flowchart illustrating a method performed by the primary network device according to the embodiments of the present invention. FIG. 3A should be viewed in conjunction with FIGS. 2A-2C.

Before allowing a local device connected to the primary network device to connect to the interconnected network through the WAN interface of the at least one secondary network device, the primary network device may perform the method illustrated in FIG. 3A in respect of each of the at least one secondary network device.

In process 301, the primary network device may establish a first link that connects to at least one secondary network device. The first link may be an Ethernet cable connecting a network interface of the primary network device (hereafter "primary network interface") and a network interface of secondary network device (hereafter "secondary network interface"). The primary network interface may be a WAN or LAN interface, and the secondary network interface may also be a WAN or LAN interface. For illustrative purposes, the first link connects WAN interface 213 of primary network device 210 and LAN interface 221 of secondary network device 220.

In one variant, both the primary network interface and the secondary network interface support the function of Power over Ethernet (POE). Therefore, primary network device 210 may provide power to secondary network device 220 through the first link.

In process 302, the user or the administrator of primary network device 210 may enable a function of managing and controlling the network configuration of secondary network device 220. For example, the user or the administrator may enable the function through a user interface or a command port of primary network device 210.

In one variant, the function may be enabled by default without the user's or the administrator's instruction. Therefore, process 303 may be performed without performing process 302.

In process 303, primary network device 210 may establish a first connection with secondary network device 220 through the first link. To establish the first connection, primary network device 210 may receive a first request from secondary network device 220 through the first link, and send a first reply for replying to the first request.

In one preferred embodiment, the first request may be a Dynamic Host Configuration Protocol (DHCP) discover message, and the first reply may be a DHCP offer message.

In another embodiment, the first request and the first reply may be Address Resolution Protocol (ARP) request and reply messages, respectively.

In another embodiment, the first request may be a DHCP request message, and the first reply may be a DHCP acknowledgment (ACK) message.

In another embodiment, the first request may be a simple request message, and the first reply may be a simple reply message.

In one variant, the first reply may further comprise authentication information, such as the authentication information on a digital certificate to be used.

In another variant, the first request and the first reply may be any of the combinations mentioned above.

In another variant, a third-device authentication is required. Primary network device 210 may ask for confirmation from the third device, such as a server, before replying to the first request with the first reply. The confirmation may be received from the third device if the condition in relation to one or more of the following is satisfied: status of the secondary network device, user's subscription, network configuration, and the result of whitelist checking. If a certain condition has not been met, then the confirmation will not be received by primary network device 210.

In process 304, after the first connection is established, primary network device 210 may receive a second request from secondary network device 220 through the first connection.

In one embodiment, the second request may comprise device information of secondary network device 220, selected from one or more of the following: authentication information, network information, configuration, and policy.

In another embodiment, the authentication information of secondary network device 220 may be provided by the user or the administrator of primary network device 210 such that all or part of the device information may not be included in the second request. For example, the user or the administrator may provide the device information according to the factory setting of secondary network device 220.

In one variant, the authentication information of secondary network device 220 is not provided by the user or the administrator of the primary network device. Instead, the authentication information of secondary network device 220 is stored in primary network device 210 by default.

In process 305, by using the device information of secondary network device 220, primary network device 210 may generate network configuration information of secondary network device 220. The network configuration information of secondary network device 220 may include but is not limited to one or more of the following: network interface, protocol, IP address allocation, virtual local area network (VLAN) configuration, subnet configuration, maximum transmission unit configuration, and port assignments to be utilized between the network interfaces. Details of the network configuration will be discussed later.

In process 306, primary network device 210 may send a second reply to secondary network device 220 through the first connection. The second reply may comprise the network configuration information for secondary network device 220 to configure the network configuration itself.

In process 307, after disconnecting the first connection, primary network device 210 may establish a second connection through the first link for controlling and managing secondary network device 220. The second connection is established between one virtual network interface created on the primary network interface (hereafter "primary management interface") and one virtual network interface created on the secondary network interface (hereafter "secondary management interface").

In process 308, primary network device 210 may establish the third connection through the first link for data packet transmission. More specifically, the third connection is established between one virtual network interface created on the primary network interface (hereafter "primary transmission interface") and one virtual network interface created on the secondary network interface (hereafter "secondary transmission interface"). The primary transmission interface and the secondary transmission interface are created upon the network interfaces connected with the first link.

Since the primary management interface and the primary transmission interface (collectively, "primary interfaces") are created on the primary network interface, a reserved IP address may be assigned as a remote IP address for each of the primary interfaces to differentiate them and implement the data transmission. Similarly, since the secondary management interface and the secondary transmission interface (collectively, "secondary interfaces") are created on the secondary network interface, a reserved IP address may be assigned as a local IP address for each of the secondary interfaces to differentiate them and implement the data transmission. The reserved IP address assigned to each of the primary interfaces and each of the secondary interfaces is unique.

There is no limitation on the method or protocol for assigning the reserved IP address. For example, Automatic Private IP Addressing (APIPA) may be utilized to assign the reserved IP address.

In one embodiment, the reserved IP address is selected from a pre-specified range of IP addresses, and an address resolution protocol (ARP) process may be implemented to achieve the uniqueness of the private IP address. The pre-specified range of IP addresses is for communication within a local network only, but not routable on the internet.

In another embodiment, the reserved IP address is randomly selected from the pre-specified range of IP addresses.

In one preferred embodiment, the pre-specified range of IP addresses is between 168.101.0.0 and 168.101.255.255.

In another embodiment, the pre-specified range of IP addresses is any of the private ranges that can be used by anyone for any purpose.

In one variant, a control profile may be created by primary network device 210 for the network configuration information of secondary network device 220.

In another variant, the control profile may be created by primary network device 210 for the network configuration information of all secondary network devices.

In one variant, the first connection may perform the same functionality as the second connection. Therefore, the second connection may be equivalent to the first connection, and process 307 is optional. However, primary network device 210 may opt to use the reserved IP address as a remote IP address of the primary management interface.

FIG. 3B is a flowchart illustrating a method performed by the secondary network device according to the embodiments of the present invention and should be viewed in conjunction with FIGS. 2A-C and 3A. For illustrative purposes, secondary network device 220 may perform the method illustrated in FIG. 3B.

In process 310, secondary network device 220 may establish a first link that connects to primary network device 210.

In one variant, secondary network device 220 is being reset before process 310 is performed. There are myriad reasons for resetting secondary network device 220, such as minimizing the chance of a crash and reducing the time of data transmission in the further process.

In another variant, only the network configuration of secondary network device 220 is reset, instead of the whole device.

In process 311, secondary network device 220 may establish the first connection with primary network device 210 through the first link. To establish the first connection, secondary network device 220 may send the first request to primary network device 210 through the first link and receive the first reply from primary network device 210 through the first link. If the first reply indicates that the function of managing and controlling the network configuration of the secondary network device is enabled on the primary network device, process 312 may be performed.

In one variant, when the first connection is established, the user or the administrator may lock the at least one secondary network device to disable any modification of the network configuration of the at least one secondary network device other than modifications made by the primary network device. More specifically, the instruction of the locking may be sent together with the first reply. The locking may be beneficial for a myriad of reasons, such as preventing the conflict of the network configuration and enhancing security. For example, an identifier, such as a string, a security key, or any combination thereof, may be included in the first reply for performing the locking. Therefore, the at least one secondary network device may perform the locking according to the identifier of the first reply.

In process 312, after the first connection is established, secondary network device 220 may send the second request to primary network device 210 through the first connection.

In process 313, secondary network device 220 may receive the second reply from primary network device 210 through the first connection.

In process 314, secondary network device 220 may configure the network configuration according to the network configuration information in the second reply.

In process 315, secondary network device 220 may establish the second connection through the first link according to the network configuration information after disconnecting the first connection.

In one variant, the first connection may perform the same as the second connection. Therefore, the second connection may be equivalent to the first connection, and process 315 becomes optional. However, secondary network device 220 may opt to use the reserved IP address as a local IP address of the secondary management interface.

In process 316, secondary network device 220 may establish the third connection through the first link.

Figure 4:
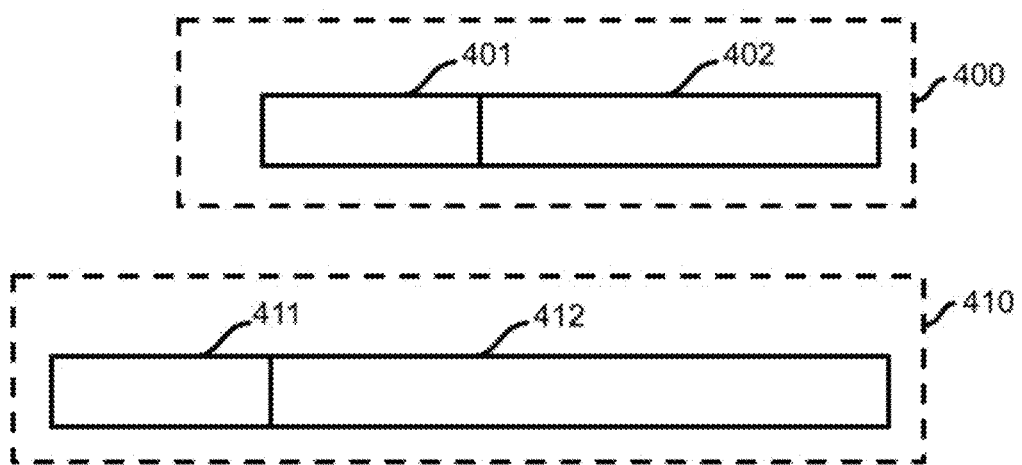
FIG. 4 is a block diagram illustrating packet structures of data packets during transmission according to the embodiments in the present invention.

FIG. 4 is a block diagram illustrating packet structures of data packets during transmission according to the embodiments in the present invention. When a primary network device receives a data packet from a local device, the packet structure of the data packet is similar to packet structure 400, which comprises header 401 and payload 402.

An encapsulated data packet with packet structure 410 may be formed when the network devices perform encapsulation on a data packet. The encapsulated data packet comprises header 411 and payload 412; payload 412 may at least comprise the data packet.

In one embodiment, payload 412 may further comprise tunnel information.

In another embodiment, the tunnel information may be part of header 411 instead of payload 412.

Figure 5:
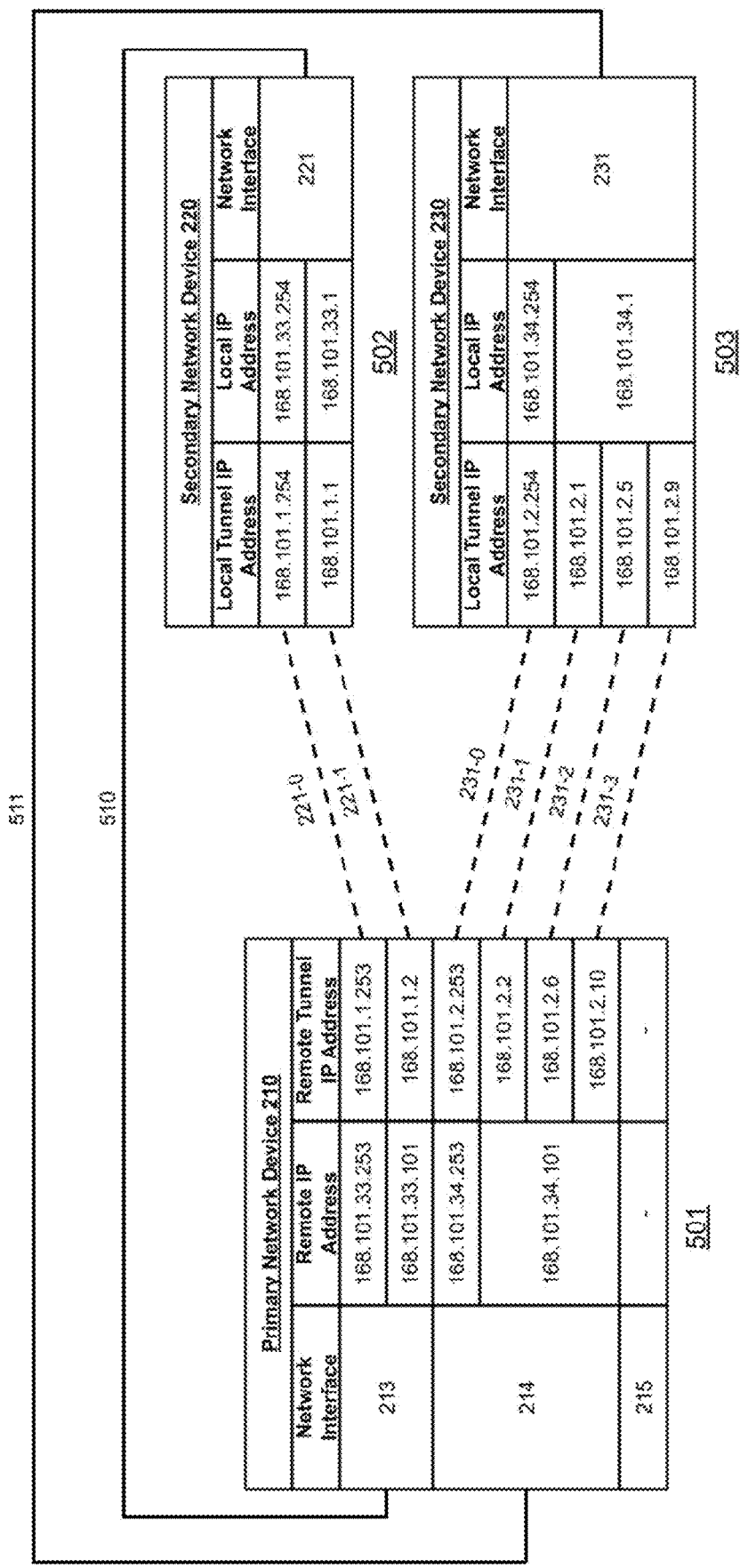
FIG. 5 illustrates the network configuration of the network devices according to the embodiments of the present invention.

FIG. 5 illustrates the network configuration of the network devices according to the embodiments of the present invention. For illustrative purposes, FIG. 5 will be described with reference to the network environment in FIG. 2B, and tables 501, 502, and 503 show part of the network configuration information of primary network device 210, secondary network device 220, and secondary network device 230 respectively.

In view of FIG. 2B, WAN interface 213 of primary network device 210 is connected to LAN interface 221 of secondary network device 220 with first link 510, and WAN interface 214 of primary network device 210 is connected to LAN interface 231 of secondary network device 230 with first link 511.

For each of the secondary network device(s) and the primary network device, the second connection and the third connection may be further established through the first link. More specifically, as discussed in FIG. 3A, the second connection is established between the primary management interface and the secondary management interface (collectively, "management interfaces"), and the third connection is established between the primary transmission interface and the secondary transmission interface (collectively, "transmission interfaces"), and a reserved IP address may be assigned for each of the management interfaces and the transmission interfaces as their remote IP address or local IP address. Each of the reserved IP addresses should be unique and selected from the pre-specified range of IP addresses. All of the management interfaces and the transmission interfaces are in the same subnet and therefore can communicate with each other.

As illustrated in FIG. 5, between primary network device 210 and secondary network device 220, a first primary management interface and a first primary transmission interface are created on top of WAN interface 213 with reserved IP address "168.101.33.253" and reserved IP address "168.101.33.101" respectively. On the other hand, a first secondary management interface and a first secondary transmission interface are created on top of LAN interface 221 with reserved IP address "168.101.33.254" and reserved IP address "168.101.33.1" respectively. Therefore, a second connection may be established between reserved IP address "168.101.33.253" and reserved IP address "168.101.33.254", while a third connection may be established between reserved IP address "168.101.33.101" and reserved IP address "168.101.33.1". It should be noted that all the IP addresses mentioned above are within a first subnet, i.e. "168.101.33.0/24".

Similarly, between primary network device 210 and secondary network device 230, a second primary management interface and a second primary transmission interface are created on top of WAN interface 214 with reserved IP address "168.101.34.253" and reserved IP address "168.101.34.101" respectively. On the other hand, a second secondary management interface and a second secondary transmission interface are created on top of LAN interface 231 with reserved IP address "168.101.34.254" and reserved IP address "168.101.34.1" respectively. Therefore, another second connection may be established between reserved IP address "168.101.34.253" and reserved IP address "168.101.34.254", while another third connection may be established between reserved IP address "168.101.34.101" and reserved IP address "168.101.34.1". It should be noted that all the IP addresses mentioned above are within a second subnet, i.e. "168.101.34.0/24".

In one preferred embodiment, the primary network device may generate the reserved IP address for each of the network interfaces. Therefore, when the primary network device enables the function to control and manage more than one secondary network device, the uniqueness of the reserved IP address can be guaranteed.

In another embodiment, the reserved IP address may be generated by the secondary network device.

For each of the secondary network device(s) and the primary network device, a management tunnel and an at least one data tunnel may be further established through the second connection and the third connection respectively. More specifically, a management tunnel is established between one tunnel interface of the primary network device created on the primary network interface (hereafter "primary management tunnel interface") and one tunnel interface of the primary network device created on the secondary network interface (hereafter "secondary management tunnel interface"). On the other hand, a data tunnel may be established between one tunnel interface of the primary network device created on the primary network device (hereafter "primary transmission tunnel interface") and one tunnel interface of the primary network device created on the secondary network device (hereafter "secondary transmission tunnel interface").

Each of the at least one data tunnel is utilized for connecting to the interconnected network through a WAN interface of the secondary network device. Therefore, the set of the at least one data tunnel established through the third connection may be in a bijective relationship with the set of the available WAN interface(s) of a secondary network device. As a result, the number of the at least one data tunnel is equivalent to the number of the available WAN interface(s).

In one variant, the third connection may be in a bijective relationship with the set of the active WAN interface(s) of a secondary network device, which is/are the WAN interface(s) capable of connecting to the interconnected network. Therefore, an extra tunnel may be established if an extra WAN interface is connected to the interconnected network.

In one embodiment, the primary network device may send a heartbeat packet periodically to determine the availability of the at least one secondary network device. The heartbeat packet may be a small packet in any form, such as an Internet Control Message Protocol (ICMP) packet, IP packet, or L2TP control packet, such that the network performance of the first link will not be affected.

The primary management tunnel interface, the secondary management tunnel interface, the primary transmission tunnel interface, and the secondary transmission tunnel interface may be collectively referred to as "tunnel interfaces". A reserved IP address may be assigned for each of the tunnel interfaces as a local tunnel IP address or remote tunnel IP address. The reserved IP addresses should be unique and selected from the pre-specified range of IP addresses. All of the tunnel interfaces are in the same subnet and therefore the tunnel interfaces may communicate with each other.

As illustrated in FIG. 5, between primary network device 210 and secondary network device 220, management tunnel 221-0 may be established through a primary management tunnel interface with reserved IP address "168.101.1.253" and a secondary management tunnel interface with reserved IP address "168.101.1.254"; and data tunnel 221-1 may be established through a primary transmission tunnel interface with reserved IP address "168.101.1.2" and a secondary transmission tunnel interface "168.101.1.1". Since there is only one available WAN interface on secondary network device 220, only one data tunnel (i.e. data tunnel 221-1) may be established.

Similarly, between primary network device 210 and secondary network device 230, management tunnel 231-0 may be established through a primary management tunnel interface with reserved IP address "168.101.2.253" and a secondary management tunnel interface with reserved IP address "168.101.2.254". Data tunnel 231-1 may be established through a first primary transmission tunnel interface with reserved IP address "168.101.2.2" and a first secondary transmission tunnel interface "168.101.2.1"; data tunnel 231-2 may be established through a second primary transmission tunnel interface with reserved IP address "168.101.2.6" and a second secondary transmission tunnel interface "168.101.2.5"; and data tunnel 231-3 may be established through a third primary transmission tunnel interface with reserved IP address "168.101.2.10" and a third secondary transmission tunnel interface "168.101.2.9".

Table 1 summarizes the relationship between the WAN interfaces and the bijective data tunnels of an illustrative embodiment:

TABLE 1

| WAN interface | Corresponding Bijective data tunnel |
|---|---|
| 222 | 221-1 |
| 233 | 231-1 |
| 234 | 231-2 |
| 235 | 231-3 |

It should be noted that for each of the secondary network device(s) and the primary network device, the tunnel interfaces may have reserved IP addresses within the same subnet. However, the tunnel interfaces may not have reserved IP addresses within the same subnet with the management interfaces and the transmission interfaces.

In one variant, the network configuration may be performed by the primary network device and/or secondary network device.

After setting up the IP address on the network interfaces, either physical or virtual, a data packet received from the local device in the same network will be routed to the interconnected network through a network interface according to a policy. The network interface may be a WAN interface of the primary network device or a WAN interface of the secondary network device, and the policy may be based on one or more of the following: type of network interface, service provider (such as internet service provider), bandwidth, throughput, latency, cost, location, type of data packet, application, user, user group, user preference, source address, and destination address.

In one exemplary embodiment, the policy may be based on latency, where it is preferable to route the data packet via a network interface or a connection with the lowest latency. For example, in view of the network environment in FIG. 2B, there are four terminal WAN interfaces connecting directly to the interconnected network, i.e. WAN interfaces 222, 233, 234 and 215. If the latency of WAN interfaces 222, 233, 234 and 215 are 12 ms, 30 ms, 40 ms, and 25 ms respectively, then primary network device 210 may determine that the data packet shall be routed via WAN interface 222.

In another exemplary embodiment, the policy may be based on the throughput, where it is preferable to route the data packet via a network interface or a connection with the highest throughput. For another example, in view of the network environment in FIG. 2B, if the throughput of WAN interfaces 222, 233, 234 and 215 are 10 Mbps, 30 Mbps, 25 Mbps and 28 Mbps respectively, then primary network device 210 may determine that the data packet shall be routed via WAN interface 233.

In one embodiment, the primary network device may further update the firmware of the secondary network device through the management tunnel and/or the at least one data tunnel.

Figure 6:
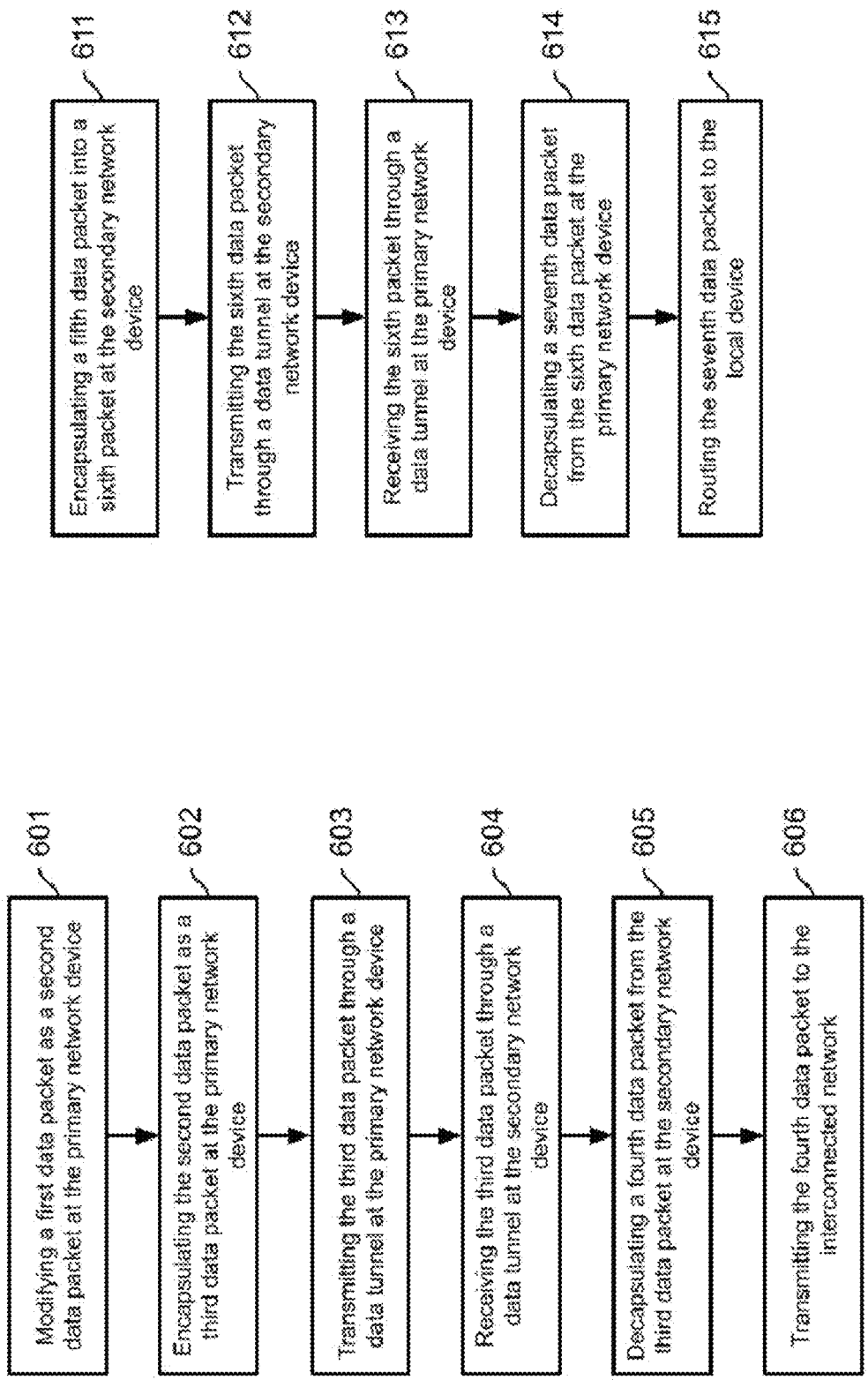
FIG. 6A is a flowchart illustrating the processes being performed between the primary network device and the secondary network device according to the embodiments of the present invention.
FIG. 6B is a flowchart illustrating another set of processes being performed between the primary network device and the secondary network device according to the embodiments of the present invention.

FIG. 6A is a flowchart illustrating the processes being performed between the primary network device and the secondary network device according to the embodiments of the present invention, and should be viewed in conjunction with FIGS. 2B and 5. After receiving a first data packet from the local device, the processes illustrated in FIG. 6A may be performed only if the first data packet is determined to be transmitted to the interconnected network via a determined WAN interface, which is a network interface of the secondary network device utilized by the primary network device. For illustrative purposes, primary network device 210 is determined to route the first data packet to the interconnected network via the determined WAN interface, such as WAN interface 222 of secondary network device 220.

In process 601, primary network device 210 may modify the first data packet as a second data packet. The header of the first data packet may be modified according to the network configuration such that the data packet is deemed to be sent by WAN interface 222 originally. For example, the source address of the first data packet may be modified from an IP address of the local device "192.168.0.1" to the public IP address of WAN interface 222, such as "30.2.2.2".

In process 602, primary network device 210 may encapsulate the second data packet into a third data packet with a packet structure similar to packet structure 410, which comprises header 411 and payload 412. Payload 412 comprises at least the second data packet, while header 411 at least comprises a source address and a destination address corresponding to the primary transmission tunnel interface and the secondary transmission tunnel interface respectively. For illustrative purposes, if the third data packet is assigned to be transmitted through data tunnel 221-1, which is the bijective data tunnel of the determined WAN interface, then the source address and the destination address of the third data packet are "168.101.1.2" and "168.101.1.1" respectively.

In one variant, the source address and the destination address of the third data packet are possibly a remote IP address of the primary transmission interface and a local IP address of the secondary transmission interface respectively; however, the tunnel information may be further required for determining which data tunnel is used for transmission. The tunnel information may be part of the header or part of the payload. For example, a tunnel ID may be required for the third data packet if the source address and the destination address of the third data packet are remote IP address "168.101.33.101" and local IP address "168.101.33.1" respectively.

In process 603, primary network device 210 may transmit the third data packet through the bijective data tunnel.

In process 604, secondary network device 220 may receive the third data packet from primary network device 210 through the bijective data tunnel.

In process 605, secondary network device 220 may decapsulate the third data packet as a fourth data packet, which may be equivalent to the second data packet.

In process 606, secondary network device 220 may transmit the fourth data packet to the interconnected network via the WAN interface corresponding to the bijective data tunnel being used in process 603. The WAN interface is determined according to one or more of the following data packet information of the third data packet: source address, destination address, and the tunnel information.

In one embodiment, the WAN interface used for routing is determined according to the source address and/or the destination address of the third data packet. For example, if the destination address of the third data packet is the local tunnel IP address of data tunnel 221-1, the secondary network device may be capable of determining that WAN interface 222 may be used for routing, which is the WAN interface corresponding to data tunnel 221-1.

In another embodiment, the tunnel information may be further required to determine which WAN interface may be used for routing. For example, if the destination address of the third data packet is the local IP address of the third connection, other information or data, such as tunnel ID, may be required for determining that WAN interface 222 may be used for routing, which is the WAN interface corresponding to data tunnel 221-1.

In one variant, in process 606, the WAN interface used for routing is determined after the encapsulation. Therefore, the source address and/or the destination address of the fourth data packet may be used for determining that WAN interface 222 may be used for routing.

There is no limitation that the modification process must be performed by the primary network device; the modification process may also be performed by the secondary network device. The modification process may also be substituted by the encapsulation process, and vice versa.

FIG. 6B is a flowchart illustrating another set of processes being performed between the primary network device and the secondary network device, and should be viewed in conjunction with FIGS. 2B and 5. When a secondary network device, such as secondary network device 220, receives a fifth data packet from the interconnected network and is destined for a local device to which the primary network device is connected, process 611 may be performed.

In process 611, secondary network device 220 may encapsulate the fifth data packet into a sixth data packet with a packet structure similar to packet structure 410, which comprises header 411 and payload 412. Payload 412 at least comprises the fifth data packet, while header 411 at least comprises a source address and a destination address, corresponding to the secondary transmission tunnel interface and the primary transmission tunnel interface respectively. For illustrative purposes, if the fifth data packet is received via WAN interface 222, then the bijective data tunnel may be tunnel 221-1, and therefore the source address and the destination address of the sixth data packet may be "168.101.1.1" and "168.101.1.2" respectively.

In one variant, the source address and the destination address of the sixth data packet are possibly a local IP address of the secondary transmission interface and a remote IP address of the primary transmission interface respectively; however, the tunnel information may be further required for determining which data tunnel is used for transmission. The tunnel information may be part of the header or part of the payload. For example, a tunnel ID may be required for the sixth data packet if the source address and the destination address of the sixth data packet are local IP address "168.101.33.1" and remote IP address "168.101.33.101" respectively.

In process 612, secondary network device 220 may transmit the sixth data packet to the primary network device through the bijective data tunnel.

In process 613, primary network device 210 may receive the sixth data packet through the bijective data tunnel.

In process 614, primary network device 210 may decapsulate the sixth data packet to form a seventh data packet, which may be equivalent to the fifth data packet.

In process 615, primary network device 210 may further route the seventh data packet to the local device of primary network device 210 for further transmission.

It should be noted that there is no limitation on how the source and the destination addresses of data packets are modified.

In one embodiment, the modification of IP addresses may be performed by a Network Address Translator (NAT) component or any other means of network address translation.

In another embodiment, the modification of IP addresses may be performed by a Port Address Translator (PAT) component or any other means of port address translation. This may be done due to a need to change port number during a routing process.

In one embodiment, if the number of the at least one data tunnel is greater than 1, then the at least one data tunnel may be grouped into at least one aggregated tunnel.

Figure 7:
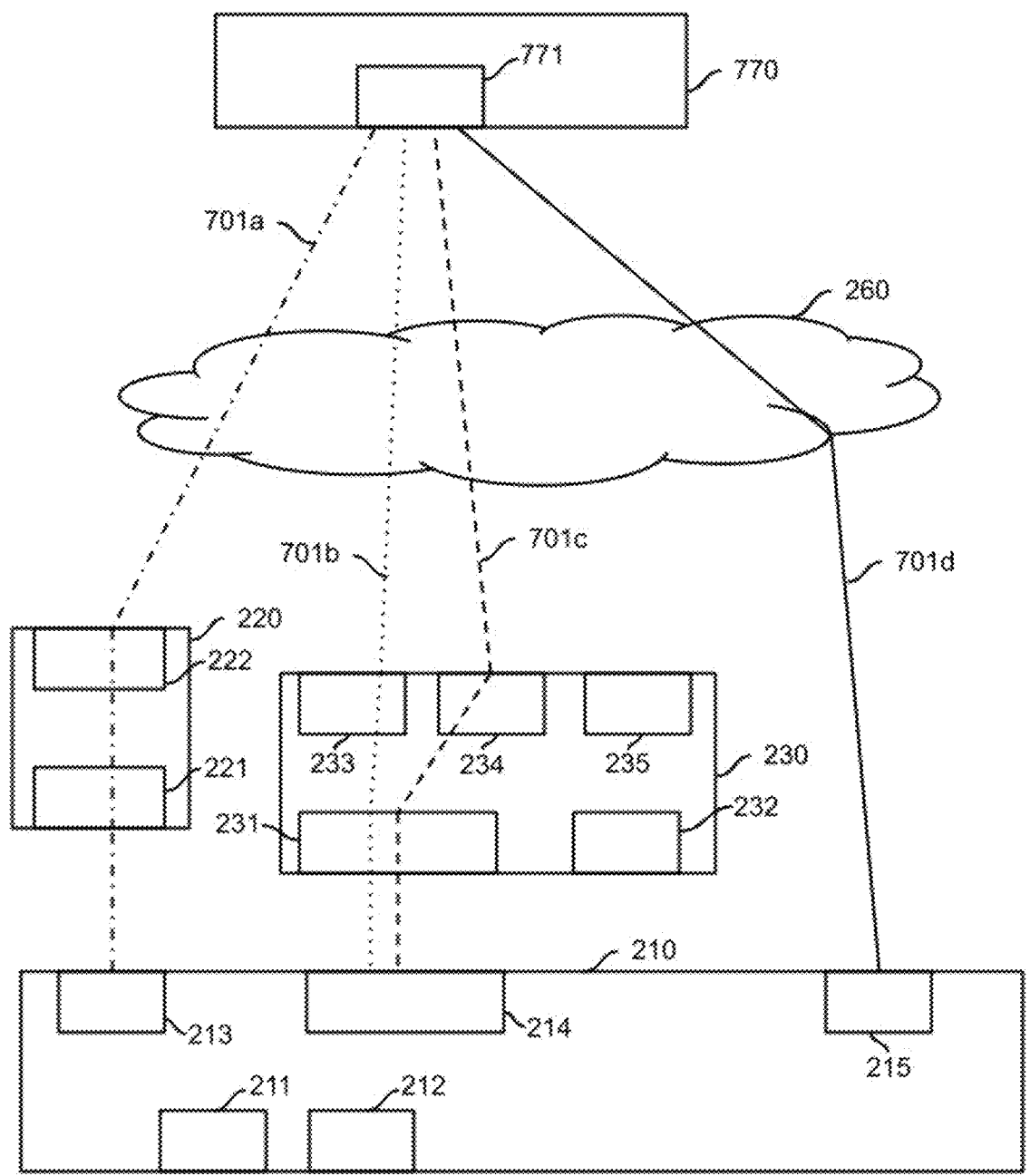
FIG. 7 illustrates an exemplary network environment according to various embodiments of the present invention.

In one variant, each of the at least one aggregated tunnel is a Virtual Private Network (VPN) tunnel as illustrated in FIG. 7.

FIG. 7 illustrates an exemplary network environment according to various embodiments of the present invention, and is based on the network environment in FIG. 2B. The network environment comprises network server 770, which comprises network interface 771. Network server 770 may establish a first link with interconnected network 260.

For illustrative purposes, a local device is connected to a server via the primary network device, and at least one VPN connection may be further established.

In one embodiment, each of the at least one VPN connection is an end-to-end connection established between a WAN interface of the local device and a WAN interface of the server.

In another embodiment, each of the at least one VPN connection is an end-to-end connection established between a WAN interface of the primary network device and a WAN interface of the server.

For illustrative purposes, each of the VPN connections 701a, 701b, 701c, and 701d are established between a WAN interface of primary network device 210 and a WAN interface network server 770. For example, VPN connection 701a is established between WAN interface 213 and network interface 771 via WAN interface 222; VPN connection 701b may be established between WAN interface 214 and network interface 771 via WAN interface 233; VPN connection 701c may be established between WAN interface 214 and network interface 771 via WAN interface 234; and VPN connection 701d may be established between WAN interface 215 and network interface 771.

In one variant, if the number of the at least one VPN connection is more than one, the at least one VPN connection may be bonded or aggregated together to form an aggregated VPN connection. The benefits of having data transmitted through the aggregated connection include higher reliability and security compared to non-aggregated VPN connections.

FIG. 8 illustrates an exemplary graphical user interface for the primary network device and shall be viewed in conjunction with FIG. 5. When the at least one secondary network device is managed and controlled by the primary network device, the network performance and the network configuration of the at least one secondary network device and the primary network device itself may be viewed, managed, and controlled in one place. As a result, a list of available network interfaces of the at least one primary network device and at least one secondary network device may be displayed on the graphical user interface.

As illustrated in FIG. 8, each of the available WAN interfaces of each of the at least one secondary network interface controlled by the primary network interface and the available WAN interface(s) of the primary network device itself are displayed in each row of the list. Connection information of each of the available WAN interface(s) is displayed on the user interface, such as the status of the WAN interface or the WAN connection, the device that the WAN interface belongs to, priority, signal strength, or throughput.

In one variant, only the terminal WAN interface(s) is displayed instead of the available WAN interface(s). As mentioned above, the terminal WAN interface(s) is/are the WAN interface(s) directly connecting to the interconnected network.

In the illustrated embodiment in FIG. 8, there are five available WAN interfaces, either from the primary network device or the secondary network device, that primary network device 210 may utilize for transmitting data to the interconnected network by establishing five available WAN connections corresponding to each. The available WAN connections included four active WAN connections named "Home_Wifi", "Satellite", "Ethernet", "4G", and one inactive WAN connection named "Broadband". Therefore, the status of "Broadband" may be displayed as "disconnected" (represented by a hollow circle) while the remaining WAN connections may be displayed as "connected" (represented by a solid circle) on the user interface.

For the active WAN connections, the connection information may be further displayed, such as the priority, signal, and device as illustrated in FIG. 8. There is no limitation on what connection information to be displayed, which may be selected by the user. Details of each connection information is discussed below.

One of the connection information that may be displayed is the origin of each of the WAN interfaces, since the WAN interface may be a WAN interface of the primary network device or a WAN interface of the at least one secondary network device.

Another connection information that may be displayed is the priority. A priority may be assigned to each of the WAN connections based on the policy. As mentioned before, the policy may be based on one or more of the following: type of network interface, service provider, bandwidth, throughput, latency, cost, location, type of data packet, application, user, user group, user preference, source address, and destination address.

For example, as illustrated in FIG. 8, the priority of the WAN connections named "Home_Wifi", "Satellite", "Ethernet", and "4G" are "Medium", "Low", "High", and "Backup" respectively. Therefore, the data packets are preferred to be transmitted to the interconnected network through the WAN connection with the highest priority, i.e. "Ethernet". If "Ethernet" is unavailable, then the data packets may be transmitted to the interconnected network through the "Home_Wifi", which is a WAN connection with the second highest priority, and so on. If those connections are all unavailable, the backup WAN connection "4G" will be used for transmitting data packets.

Another connection information that may be displayed is the latency. A WAN connection with low latency is preferable to be used for data transmission.

For example, as illustrated in FIG. 8, the latency of the WAN connections "Home_Wifi", "Satellite", "Ethernet", and "4G" are 10 ms, 31 ms, 11 ms, and 5 ms respectively. If the priority of the WAN connections are latency based, the data packets are preferred to be transmitted to the interconnected network through the WAN connection with the lowest latency, i.e. "4G", followed by "Home_Wifi", "Ethernet", and "Satellite". In the illustrative example of FIG. 8, the priority of "Home_Wifi" is the highest, followed by "Home_Wifi" and "Satellite", therefore the priority is not based on, or partly based on the latency.

It may be possible that a new WAN connection is established, or an existing WAN connection is disconnected or altered. For example, a change in ethernet connection, a change in Wi-Fi connection, or a hindrance in satellite connection. Therefore, the network information corresponding to the at least one secondary network device may be proactively updated to the primary network device, and the connection information displayed on the user interface of the primary network device may be updated on time.

In one embodiment, the at least one secondary network device may reply to the heartbeat packet with a change in the network connection.

In another embodiment, when the at least one secondary network device detects a change in network connection, the at least one secondary network device may proactively send the change in network connection to the primary network device through corresponding management tunnel or management connection.

In one variant, the at least one secondary network device may send the change in network connection to the primary network device according to the request from the primary network device.

The invention claimed is:

1. A method for transmitting data packets through a WAN interface of at least one secondary network device at a primary network device, comprising:
   a. enabling a function of managing and controlling the network configuration of the at least one secondary network device;
   b. establishing a first connection and a second connection with the at least one secondary network device;
   c. establishing a management tunnel through the first connection;
   d. establishing at least one data tunnel through the second connection; and
   e. transmitting data packets via the WAN interface of the second connection through a first data tunnel according to a policy;
   wherein:
      the first connection is a connection established between a first management interface and a second management interface;
      the second connection is a connection established between a first transmission interface and a second transmission interface;
      the first data tunnel is a data tunnel of the at least one data tunnel established between a first data tunnel interface and a second data tunnel interface; and
      the first data tunnel is corresponding to the WAN interface.

2. The method of claim 1, further comprising:
   a. receiving a first request from the at least one secondary network device;
   b. sending a first reply for replying to the first request.

3. The method of claim 2, wherein the primary network device may require authentication from a third device before replying to the first request with the first reply.

4. The method of claim 1, wherein the at least one secondary network device allows only modifications of the network configuration of the at least one secondary network device made by the primary network device.

5. The method of claim 1, wherein the policy may be based on one or more of the following: type of network interface, service provider, bandwidth, throughput, latency, cost, location, type of data packet, application, user, user group, user preference, source address, and destination address.

6. The method of claim 1, wherein the first management interface, the second management interface, the first transmission interface, and the second transmission interface are virtual network interfaces.

7. The method of claim 1, further comprising:
assigning each of the first management interface, the second management interface, the first transmission interface, and the second transmission interface with a reserved IP address individually.

8. The method of claim 1, wherein the first management interface and the first transmission interface are in a first subnet.

9. The method of claim 8, wherein the first data tunnel interface is in a second subnet.

10. The method of claim 9, wherein the first subnet and the second subnet are different subnets.

11. A primary network device, comprising:
at least one processing unit;
a plurality of network interfaces; and
at least one non-transitory computer-readable storage medium storing program instruction executable by at least one processing unit for:
a. enabling a function of managing and controlling the network configuration of at least one secondary network device;
b. establishing a first connection and a second connection with the at least one secondary network device;
c. establishing a management tunnel through the first connection;
d. establishing at least one data tunnel through the second connection; and
e. transmitting data packets via a WAN interface of the second connection through a first data tunnel according to a policy;
wherein:
the first connection is a connection established between a first management interface and a second management interface;
the second connection is a connection established between a first transmission interface and a second transmission interface;
the first data tunnel is a data tunnel of the at least one data tunnel established between a first data tunnel interface and a second data tunnel interface; and
the first data tunnel is corresponding to the WAN interface.

12. The primary network device of claim 11, wherein the at least one non-transitory computer-readable storage medium further storing program instruction executable by at least one processing unit for:
a. receiving a first request from the at least one secondary network device;
b. sending a first reply for replying to the first request.

13. The primary network device of claim 12, wherein the primary network device may require authentication from a third device before replying to the first request with the first reply.

14. The primary network device of claim 11, wherein the at least one secondary network device is locked and allows only modifications made by the primary network device.

15. The primary network device of claim 11, wherein the policy may be based on one or more of the following: type of network interface, service provider, bandwidth, throughput, latency, cost, location, type of data packet, application, user, user group, user preference, source address, and destination address.

16. The primary network device of claim 11, wherein the first management interface, the second management interface, the first transmission interface, and the second transmission interface is a virtual network interface.

17. The primary network device of claim 11, wherein the at least one non-transitory computer-readable storage medium further storing program instruction executable by at least one processing unit for:
assigning a reserved IP address to each of the first management interface, the second management interface, the first transmission interface and the second transmission interface individually.

18. The primary network device of claim 11, wherein the first management interface and the first transmission interface are in a first subnet.

19. The primary network device of claim 18, wherein the first data tunnel interface is in a second subnet.

20. The primary network device of claim 19, wherein the first subnet and the second subnet are different subnets.

* * * * *